(12) United States Patent
Buttet

(10) Patent No.: US 6,532,158 B1
(45) Date of Patent: Mar. 11, 2003

(54) ELECTRONIC APPARATUS COMPRISING A GROUP OF CHIPCARDS

(75) Inventor: Jean-Pierre Buttet, Martigny (CH)

(73) Assignee: Smartdata SA, Martigny (CH)

( * ) Notice: Subject to any disclaimer, the term of this patent is extended or adjusted under 35 U.S.C. 154(b) by 0 days.

(21) Appl. No.: 09/640,978

(22) Filed: Aug. 17, 2000

(30) Foreign Application Priority Data

Aug. 25, 1999 (EP) .............................................. 99810762
Sep. 3, 1999 (EP) .............................................. 99810796

(51) Int. Cl.⁷ .............................. H05K 7/14; H05K 7/18
(52) U.S. Cl. ....................... 361/796; 361/735; 361/790; 361/736; 361/737; 361/792
(58) Field of Search ................................. 361/735, 790, 361/737, 736, 796, 787, 789, 792

(56) References Cited

U.S. PATENT DOCUMENTS

| | | | | |
|---|---|---|---|---|
| 4,834,660 A | * | 5/1989 | Cotti | 439/67 |
| 5,731,633 A | * | 3/1998 | Clayton | 257/723 |
| 5,912,801 A | * | 6/1999 | Roy et al. | 361/690 |
| 6,010,066 A | * | 1/2000 | Iton et al. | 235/379 |
| 6,011,741 A | * | 1/2000 | Wallace et al. | 365/221 |
| 6,250,965 B1 | * | 6/2001 | Neifer | 361/735 |
| 6,256,208 B1 | * | 7/2001 | Supinski et al. | 361/784 |

* cited by examiner

*Primary Examiner*—David Martin
*Assistant Examiner*—Thanh Y. Tran
(74) *Attorney, Agent, or Firm*—Oliff & Berridge, PLC

(57) ABSTRACT

Electronic device including a housing for receiving chipcards having electrical connection elements which are situated on at least one of their lateral faces, said electronic device including:

chipcard holding means arranged to keep these cards each in a predetermined position and orientation with respect to one another, means of electrical connection with each of the electrical connection elements of a card, which means of electrical connection are arranged to cooperate with the electrical connection elements of a card positioned in the housing, and means of controlling the functions of the different cards placed in the housing through the expedient of electrical connections established between the means of electrical connection.

15 Claims, 4 Drawing Sheets

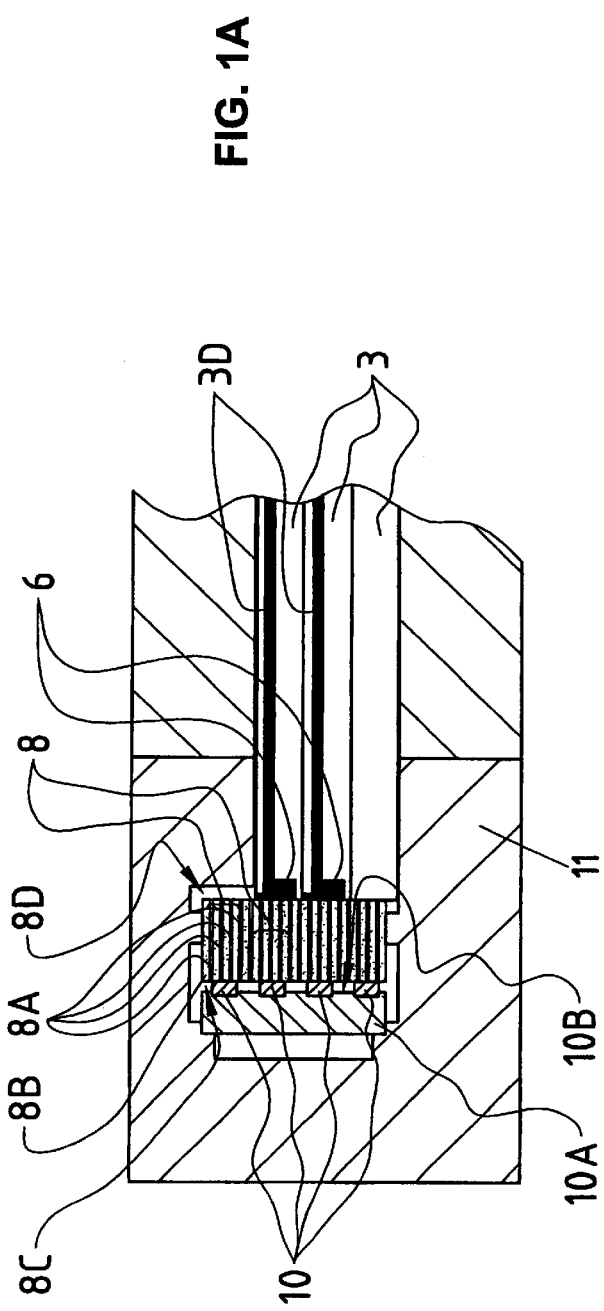
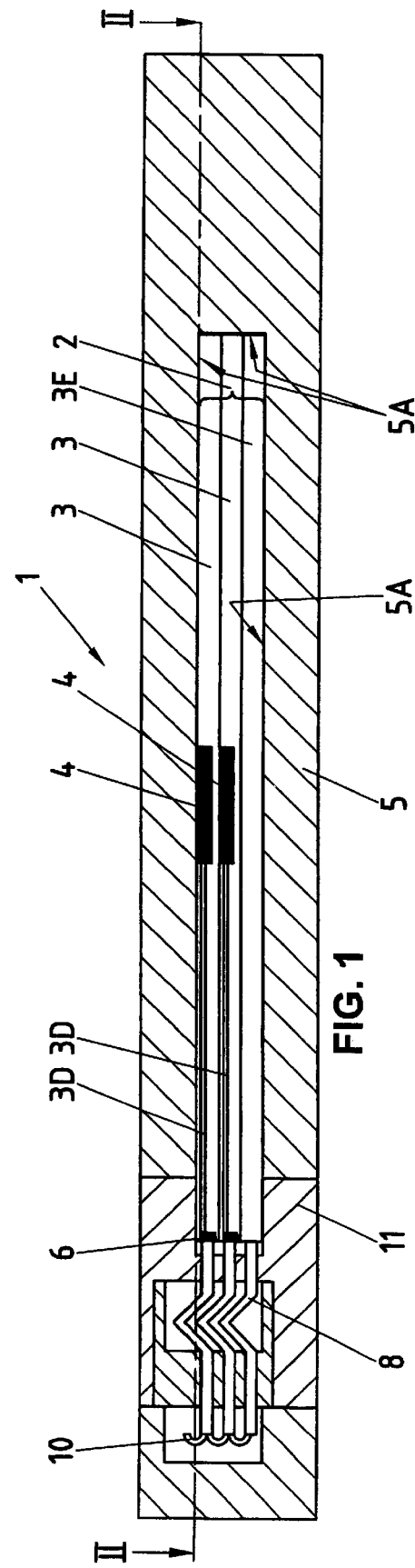
FIG. 1A
FIG. 1

ELECTRONIC APPARATUS COMPRISING A GROUP OF CHIPCARDS

This invention relates to an electronic apparatus which comprises a group of chipcards with predetermined functions. It also relates to chipcards intended for this apparatus. The invention concerns more specifically, but not exclusively, an apparatus that allows functions of different chipcards to be associated and/or combined.

Designated by chipcard is a flat piece, preferably rectangular, which supports at least one electronic component equipped with elements each intended to establish an electrical connection with a separate part of the card.

One result which the invention aims to obtain is the creation of an electronic apparatus in a modular way, i.e. by grouping together chipcards intended to be used individually in separate applications.

Another result which the invention aims to obtain is an apparatus of the aforementioned type, but of reduced size.

Meant by an apparatus of reduced size is one whose format is approximately that of a chipcard and whose thickness substantially corresponds to the thickness of the group of chipcards that it comprises.

To this end the invention has as its object an apparatus of the aforementioned type wherein in particular the apparatus consists of a housing comprising:

chipcard holding means which means are arranged to keep these cards each in a predetermined position and orientation with respect to one another, means of electrical connection with each of the electrical connection elements of a card, which means of electrical connection are arranged to cooperate with the electrical connection elements of a card positioned in the housing, a means of controlling the functions of the different cards placed in the housing through the expedient of electrical connections established between the different cards.

The invention also has as its object chipcards intended for this apparatus.

The invention will be better understood from reading the following description given by way of non-limiting example with reference to the annexed drawings or diagrams:

FIG. 1 is a sectional view of an electronic apparatus according to the present invention.

FIG. 1A is a sectional view of a detail, shown enlarged, of an apparatus according to the invention in a variant embodiment.

Figure 2:
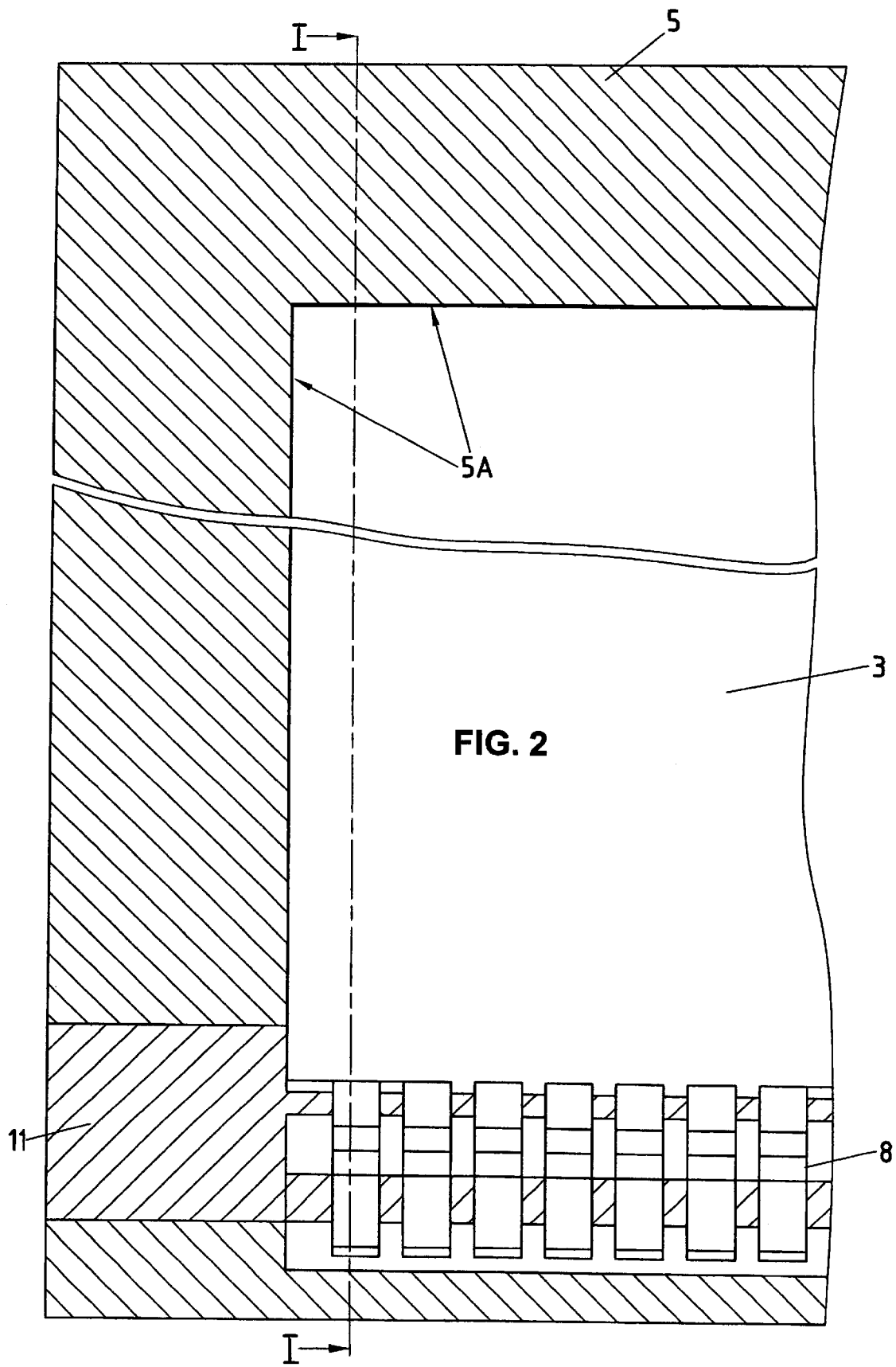
FIG. 2 is a partial view of a section of this electronic apparatus parallel to the level of the card.
Figure 3:
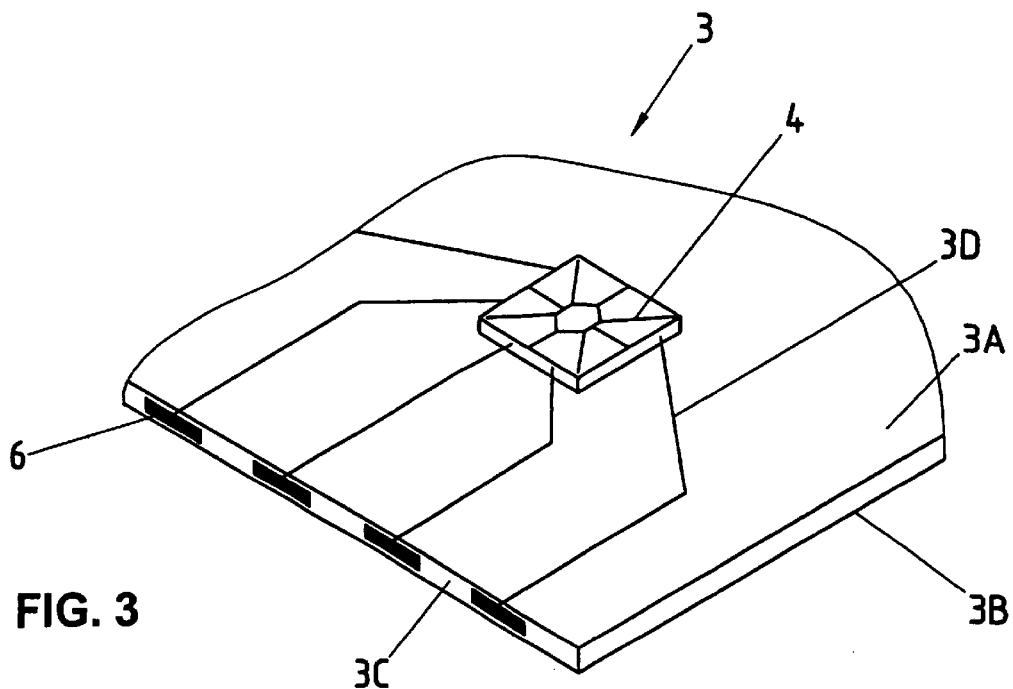
FIG. 3 is a partial view, in perspective, of a chipcard with contacts on one face.

In FIGS. 1 to 5, an electronic apparatus 1 can be seen comprising a group 2 of chipcards 3 each having a predetermined function. The cards can have different functions, for example.

Designated by chipcard 3 (FIG. 3) is a flat piece, preferably rectangular but not limited thereto, comprising two opposite mainfaces 3A, 3B and narrow lateral faces 3C, which supports at least one electronic component 4 equipped with elements 3D terminating in an electrical connection element 6 each intended to establish an electrical connection with a separate part of the card 3, such as an electronic device for reading and/or writing data on this card 3.

The elements 3D equipped with electrical connection elements are elements for conduction of electricity.

The apparatus 1 groups together, for example:

a card 3 of the type used for processing information coming from other cards or for processing bank transactions (micro-computer), a card 3 of the type allowing a radio-telephonic connection to be established, a card 3 comprising a screen, of the tactile type, for display of information, i.e. a display screen having zones sensitive to finger touch, a card 3 comprising a supplementary electric supply source, a card 3 comprising a memory module, a dummy card 3E, i.e. a card made up simply of a wedge of thickness so that the housing (further described below) is completely filled.

The cards, for example, are called: CPU, RAM memory, EEPROM memory, screen, keyboard, modem, speaker, microphone, solar cell, wireless telephone card, filler card, infrared communication card. These cards have preferably the dimensions of 86×54×0.8 mm.

It is to be noted that the apparatus 1 consists of a housing 5, which has already been mentioned above, comprising:

chipcard holding means 5A which means are arranged to keep these cards each in a predetermined position and orientation with respect to one another, means 8 of electrical connection with each of the electrical connection elements 6 of a card 3, which means 8 are arranged to cooperate with the electrical connection elements of a card positioned in the housing, a means of controlling the functions of the different cards placed in the housing through the expedient of electrical connections 10 established between the means 8 of electrical connection.

This makes it possible to achieve an electronic apparatus 1 in a modular way starting from chipcards 3 intended to be used individually or in a cooperative way (FIGS. 1 to 5).

It is to be noted that the chipcard holding means 5A are arranged to hold the cards 3 in the form of a stack and in contact through their opposite main faces 3A, 3B.

The chipcard holding means 5A are made up by the inner faces 5A of the housing 5.

Through these technical features it is possible to obtain the result aimed for by the invention, i.e. an apparatus 1 which has a reduced thickness.

Figure 4:
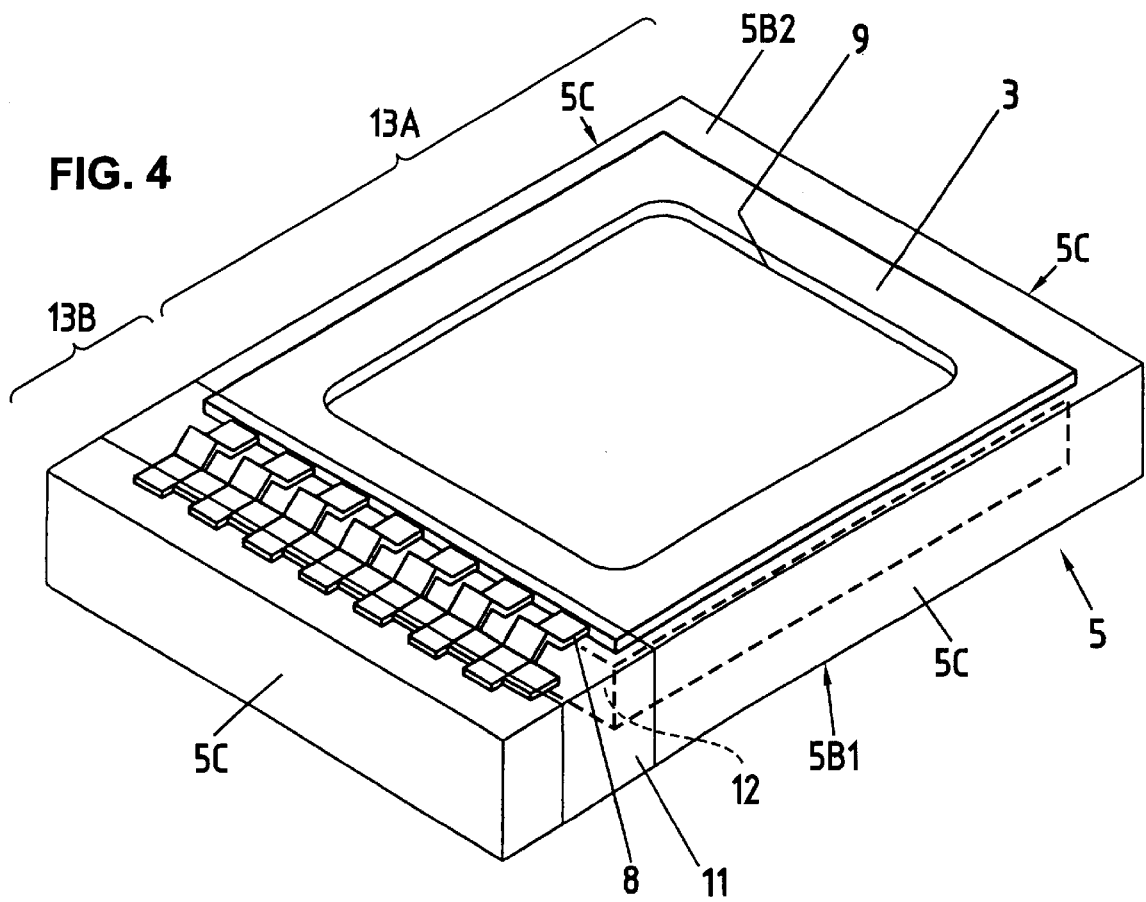
FIG. 4 is a view of the disposition of the chipcard in the electronic apparatus.
Figure 5:
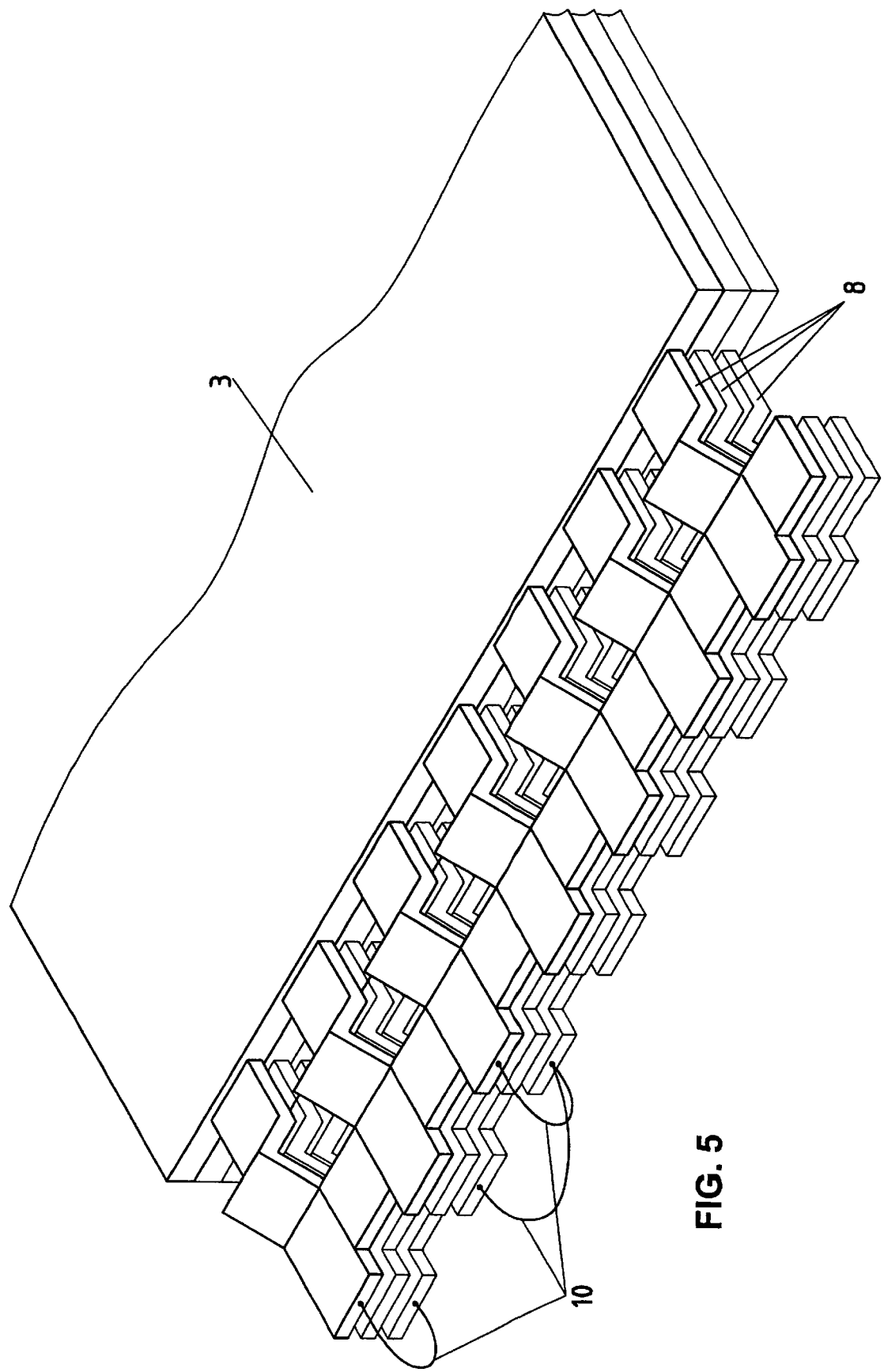
FIG. 5 is a partial view of a stack of three chipcards and contact elements.

Moreover it is to be noted that on the one hand, these cards have electrical connection elements 6 that are situated on at least one of their lateral faces (FIG. 3), and on the other hand, the means 8 of electrical connection are borne by a closure element 11 (further described below), and are arranged to cooperate with the electrical connection elements 6 situated on at least one of the lateral faces 3C of a card (FIG. 4).

It is also to be noted that the housing has at least one aperture 9 which makes possible digital access to the exposed face of one of the cards making up the opposite faces of the stack of cards which it groups together (FIG. 4). In this case it is the card having a tactile screen that is placed in front of the aperture.

It is also to be noted that the housing 5 comprises a card loading trap 12 closed off by a removable closure element 11, which has already been mentioned above, which bears means 8 of electrical connection with the cards. At least the closure element 11 of the housing 5 is made of electrically insulating material.

Taking into account the generally rectangular shape of the cards 3, the housing 5 has an encasing volume of substantially parallelepiped, rectangular shape, i.e. it comprises two opposite main faces 5B1, 5B2 and four lateral faces 5C that are narrow with respect to the said main faces 5B1, 5B2.

The trap 12 for loading the cards 3 is achieved close to one of the lateral faces 5C of the housing 5 in a way so as to divide transversely the internal volume of said housing and thus the housing itself into two sections 13A, 13B of unequal length, each section 13A, 13B able to house a portion of the volume defined by the stack of cards 3.

In this way, one of the sections 13A, 13B of the housing 5, preferably the shorter 13B, makes up the removable element 11 that bears the means of electrical connection 8.

The two sections 13A, 13B of the housing 5 are put together along a joint face which can be effectively flat or bent.

The two sections of the housing 5 are preferably provided with a means of locking in closed position.

So as not to clutter of the drawings, these last-mentioned technical details have not been shown, but one skilled in the art will be able to select the exact situation and shape of the joint face as well as the nature of the locking means without going beyond the scope of this invention.

In one embodiment, the means of controlling the functions of the different cards 3 is formed, on the one hand, by the set of electrical connections 10 established between the means 8 of electrical connection and, on the other hand, by at least one of the electronic components 4 of one of the cards 3.

In another embodiment, the means of controlling the functions of the different cards is formed, on the one hand, by the set of electrical connections 10 established between the means 8 of electrical connection and, on the other hand, by at least one electronic component accommodated in the removable element 11.

As concerns the means 8 of electrical connection, they are preferably each made up of an electrical conducting element resiliently movable in a direction of application toward an electrical connection element 6 of a card 3 when the housing is closed. This way the establishment of electrical connections is ensured.

For example, each means 8 of electrical connection is made up of a blade 8 comprising:

a fixed part integral with the removable closure element 11, a movable part, intended to establish an electrical contact with an electrical connection element 6 of a card 3, which movable part is guided in translation in the removable element 11, and this is done in a direction of application toward an electrical connection element 6 of a card 3, an interim part, interposed between the said fixed and movable parts, which is elastically deformable at least in the direction of application of the movable part.

For example, as shown in FIG. 1, the interim part of each blade is shaped like a V.

Although it is not clearly shown in the drawings, the blades 8 are electrically insulated with respect to one another.

In a variant embodiment, the conducting elements of the means 8 of electrical connection are made up of a plurality of filaments 8A of a group of electrically conducting filaments disposed substantially parallel in a matrix 8B of flexible and electrically insulating material. The matrix preferably has the form of a fine blade with two parallel faces 8C, 8D, and the conducting elements are disposed substantially perpendicular to the said parallel faces, thus ensuring in each case the electrical connection between at least two points each disposed on one of these faces.

In the electronic apparatus 1, the matrix containing the conducting elements is compressed between, on the one hand, a plate 10A on the surface 10B of which strip conductors 10 have been disposed, and, on the other hand, the electrical connection elements 6 of the cards 3, which ensures a good electrical contact. These technical features make it possible to construct means of electrical connection having a thickness on the order of one millimeter.

To insert the cards 3 in the housing 5:

the cards 3 are stacked in a pile able to be received by the housing 5 and in so doing the cards are oriented in such a way that their elements 6 of electrical connection are all facing the same way in the stack, after opening the housing 5, i.e. moving aside the removable element 11 which closes off the access to the internal volume of the housing, the stack of cards 3 is inserted in the longer section of the said housing 5 until the cards abut an inner face of this housing, and this by the face of the pile opposite to that uniting the card faces provided with electrical connection elements 6, the removable element 11 is engaged on the card stack so as to place the electrical connection means 8 in alignment with the electrical connection elements 6 of the cards 3, and finally, the removable element 11 and the housing 5 are locked.

As already mentioned, the stack includes, for example, at least one dummy card made up of a wedge of thickness such that the said stack adjusts itself precisely to the internal volume of the housing.

What is claimed is:

1. An electronic apparatus with a housing for receiving chipcards having electrical connection elements disposed on at least one of their lateral faces comprising:

chipcard holding means disposed so as to maintain the chipcards in the form of a stack with their opposite main faces in contact, means of electrical connection with each of the electrical connection elements of a card, said means of electrical connection disposed to cooperate with the electrical connection elements of a card positioned in the housing, and means of controlling the functions of the different cards placed in the housing, through the expedient of electrical connections established between the means of electrical connection.

2. The electronic apparatus according to claim 1, wherein said housing has at least one aperture allowing access to a main face of one of the cards disposed on the stack of cards which it groups together.

3. The electronic apparatus of claim 1, wherein said housing comprises a card loading trap, and said trap contains means of electrical connection with the cards.

4. The electronic apparatus of claim 3, wherein said housing has a substantially rectangular shape and includes two opposite main faces and four lateral faces, and wherein said card loading trap is provided close to one of the lateral faces of the housing in a way so as to divide transversely said housing into two sections of unequal length, each section able to house a portion of the stack of cards.

5. The electronic apparatus of claim 1, wherein said means of controlling the functions of the different cards is composed of, on the one hand, the group of electrical connections established between the means of electrical connection and, on the other hand, at least one of the electronic components of one of the cards.

6. The electronic apparatus of claim 1, further comprising a removable closure element.

7. The electronic apparatus of claim 6, further comprising an electronic component accommodated in said removable closure element, wherein said means of controlling the functions of the different cards is composed of, on the one hand, the group of electrical connections established between the means of electrical connection and, on the other hand, at least one electronic component from a group comprising said electronic component accommodated in said removable closure element and the electronic components of the cards.

8. The electronic apparatus of claim 1, wherein the means of electrical connection are each made up of an electrical conducting element resiliently movable in a direction of application toward an electrical connection element of a card, when the housing is closed.

9. An electronic apparatus with a housing for receiving chipcards having electrical connection elements disposed on at least one of their lateral faces comprising:

chipcard holding means disposed so as to maintain the chipcards in the form of a stack with their opposite main faces in contact, means of electrical connection with each of the electrical connection elements of a card, said means of electrical connection comprising conducting elements which are each made up of a plurality of filaments of a set of electrically conducting filaments disposed substantially parallel to each other in a matrix of flexible and electrically insulating material, said means of electrical connection disposed to cooperate with the electrical connection elements of a card positioned in the housing, and means of controlling the functions of the different cards placed in the housing, through the expedient of electrical connections established between the means of electrical connection.

10. The electronic apparatus of claim 9, wherein the matrix has the form of a blade with two faces parallel to each other and the conducting elements are disposed substantially perpendicular to said faces in such a way that each establishes an electrical connection between at least two points each disposed on one of said faces.

11. The electronic apparatus of claim 10, wherein the blade forming the matrix containing the conducting elements is compressed between, on the one hand, a plate having a surface provided with electrical strip conductors, and, on the other hand, the electrical connection elements of the cards.

12. A chipcard having electrical connection elements which are situated on at least one of its lateral faces, the card being intended to be introduced into an electronic apparatus as defined in claim 1.

13. The card of claim 12, wherein it comprises one or more of the following functions: CPU, RAM memory, EEPROM memory, screen, keyboard, modem, speaker, microphone, solar cell, wireless telephone card, filler card, infrared communication card.

14. The card of claim 13, having substantially the dimensions of 86×54×0.8 mm.

15. The card of claim 12, having substantially the dimensions of 86×54×0.8 mm.

* * * * *